United States Patent Office 3,453,785
Patented July 8, 1969

3,453,785
CYLINDRICAL GRINDING DEVICE
Kiyoshi Hajikano, 8, 3-chome, Sendagaya,
Shibuya-ku, Tokyo, Japan
Filed Oct. 21, 1966, Ser. No. 588,465
Claims priority, application Japan, Oct. 25, 1965,
40/65,060
Int. Cl. B24b 19/08
U.S. Cl. 51—330                                    5 Claims

ABSTRACT OF THE DISCLOSURE

A grinding device in which a plurality of grinding rolls are arranged in an annular array around the common axis of a pair of cylinders which pivotably support the rolls at their ends and which are angularly and axially displaceable relative to one another. The grinding rolls cooperatively define an aperture in which a workpiece may be received and ground, and the shape of the bounding surface of the aperture may be varied from that of a cylinder to that of a hyperboloid. The size of the aperture formed by the hyperboloidal surface is varied by the angular and axial relative movement of the cylinders.

---

In the conventional art of grinding a cylindrical body, a grinding wheel is moved parallel to an axis of a workpiece, and the workpiece and the wheel contact each other at only one point. Therefore, the machining efficiency cannot be expected to be high and, if the grinding wheel is cracked or chipped even partially, precise and smooth grinding operation becomes impossible.

The present invention has as an object to overcome such disadvantages of the conventional grinders and to attain an improved grinding efficiency with a simplified construction having the advantageous features as will be described hereinafter.

In accordance with the invention, the grinding device comprises a pair of supporting cylinders in coaxially spaced relation, means for axially displacing and angularly rotating the cylinders relative to one another, a plurality of grinding rolls arranged in an annular array around the common axis of the cylinders to cooperatively define a surface in the shape of a body of revolution which bounds an aperture in which a workpiece may be received and ground, and means supporting said rolls at the ends thereof, from respective cylinders for pivotable movement and circumferential displacement relative thereto such that relative axial and angular displacement of said cylinders will produce variation in the size of said aperture and in the shape of said body of revolution.

The invention will now be described in more detail by reference to the appended drawings showing an embodiment thereof.

In the accompanying drawings showing an embodiment of the invention in which.

Figure 1:
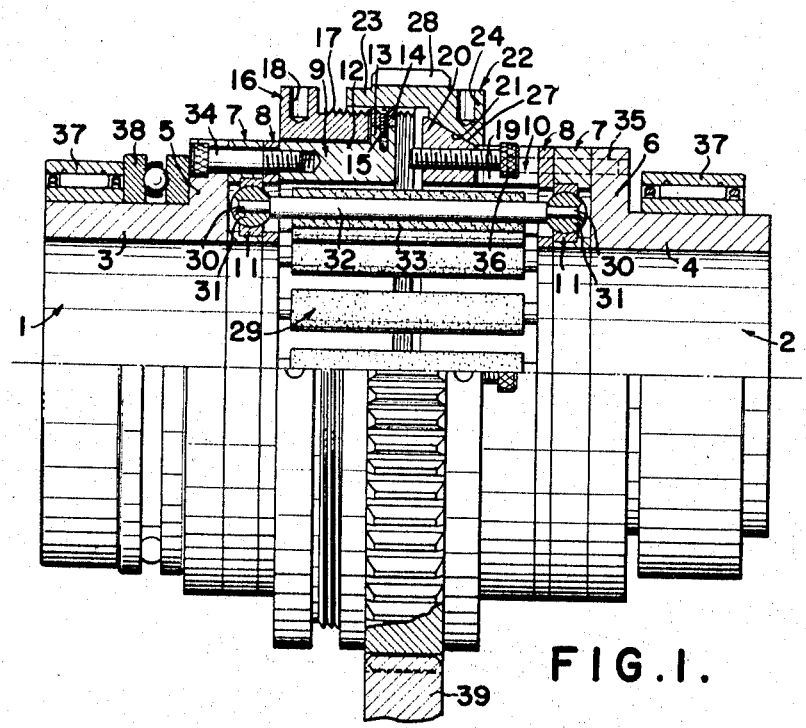
FIG. 1 is a side view of the embodiment in which, the upper half is broken away and shown in longitudinal section.
Figure 2:
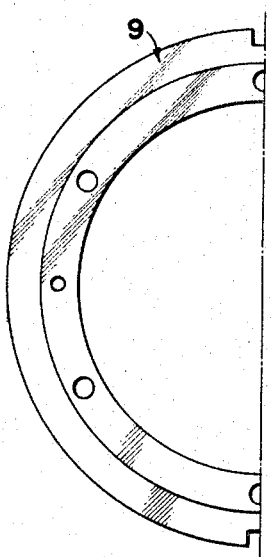
FIG. 2 is an end view of half of the left inner ring of the embodiment of FIG. 1.
Figure 3:
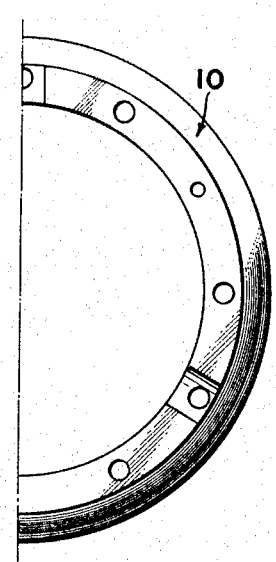
FIG. 3 is an end view of the half of right inner ring of the embodiment of FIG. 1.
Figure 4:
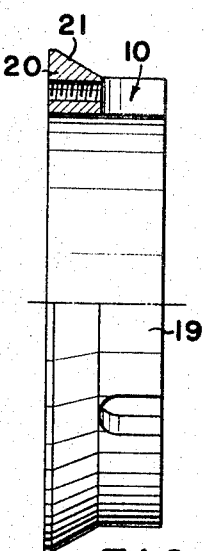
FIG. 4 is a side view of the inner ring of FIG. 3, the upper half being broken away and shown in longitudinal section.
Figure 5:
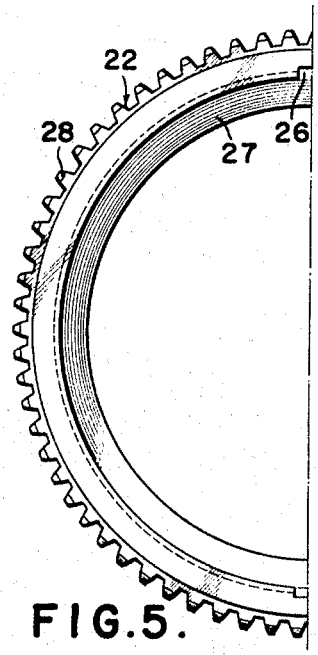
FIG. 5 is an end view of half of the outer ring of the embodiment of FIG. 1.
Figure 6:
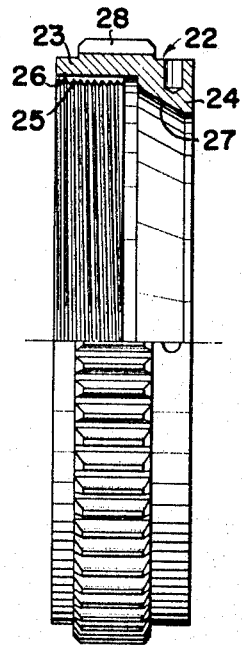
FIG. 6 is a side view of the outer ring of FIG. 5, the upper half of which is shown in longitudinal section.
Figure 7:
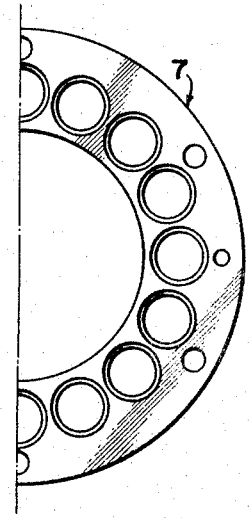
FIG. 7 is an end view of a half of roll supporting ring of the embodiment of FIG. 1.

In the drawings, the embodiment includes a pair of hollow supporting cylinders 1, 2 suitably spaced apart and arranged coaxially opposite to each other. Hollow cylindrical parts 3, 4 of the cylinders are provided on their inner ends and adjacent thereto with outward flanges 5, 6, respectively. At the inside of the flange 5 of the left supporting cylinder 1, there are provided a roll supporting ring 7, roll supporting ring cover 8, and left inner ring 9, in the order mentioned. Similarly, another roll supporting ring 7, roll supporting ring cover 8, and right inner ring 10 are arranged inside of the flange 6 of the right supporting cylinder 2. The roll supporting rings 7, are provided respectively with sets of sixteen bearings 11, having spherical inner surfaces and which are arranged equidistantly on the same circles.

On the right end of the left inner ring 9 is provided a flange 13 which extends outwardly therefrom and adjacent the cylindrical part 12. The flange 13 has keys 14 secured by screws 15 in positions around the circumference. A hollow tightening cylinder 16 is slidably fitted onto the cylindrical part 12. The outer surface of the tightening cylinder 16 has threads 17 and four handle holes 18. The right inner ring 10 has an outward flange 20 on the left end and adjacent the cylindrical part 19 thereof. A tapered surface 21 is formed on the periphery of the flange 20. Around the left and right inner rings 9, 10, a common outer ring 22 is provided, which consists of a cylindrical part 23 and an inward flange 24 on the right end adjacent said cylindrical part. On the inner surface of the cylindrical part 23, there are provided a threaded portion 25 to engage with the threaded portion 17 of the tightening cylinder 16 and key ways 26 to engage with the keys 14 on said left inner ring 9. On the inner periphery of the flange 24 of the outer ring 22, a tapered surface 27 engages the tapered surface 21 of the right inner ring 10. Teeth 28 are provided on the circumference of the outer ring 22.

A plurality (for example sixteen) grinding rolls 29 are arranged around the longitudinal axis of rings 9, 10, and spherical bearings 31 are provided at the necks 30 on both ends of said rolls, and are supported by the bearings 11 of the roll supporting rings 7, in such manner that the grinding rolls 29 are pivotably supported with respect to the roll supporting rings 7. Each grinding roll 29 consists of a spindle 32 on which a cylindrical tubular grinding sleeve is mounted. The sleeve may be of metal with diamonds embedded therein. Six bolts 34 and two knock pins 35 (not shown) are passed through the flange 5 of the left supporting cylinder 1 from the left side thereof and screwed or inserted into the cylindrical part 12 of the left inner ring 9 through roll supporting ring 7, and supporting ring cover 8, so as to secure the flange 5, ring 7, cover 8 and left inner ring 9 together. Likewise, two knock pins 35 and six bolts 34 (not shown) are passed through the flange 6 of the right supporting cylinder 2 from the right side thereof and are inserted or screwed into the cylindrical part 19 of the right inner ring 10 through ring 7 and cover 8 thereby to secure said flange 6, ring 7, cover 8 and the right inner ring 10 together. Three other bolts 36 are screwed through the right inner ring 10 from the right to left.

The cylindrical parts 3, 4 of the left and right supporting cylinders 1, 2 are supported by roller bearings 37 and are held in position. The flange 5 of the left supporting cylinder 1 is supported by a thrust bearing 38, and the teeth 28 of the outer ring 22 is kept in mesh with teeth 39 of a member driven by a motor (not shown).

If, in the construction as above described, the three bolts 36 on the right inner ring are suitably screwed to the right and the inner rings 9, 10 are suitably rotated in opposite directions relative to each other, then all the grinding rolls 29 are suitably inclined and, at the same time, the distance between the left and right inner rings 9, 10 is shortened. At this time, the left inner ring 9 slides toward the outer ring 22 by the key 14 and key way 26 in the axial direction, while the right inner ring 10 rotates relative to the outer ring 22 due to the tapered surfaces 21, 27.

Thereafter, the three bolts 36 on the right inner ring 10 are screwed to the left to bring the tip portions of the bolts into contact with the right side of the flange 13 of left inner ring 9. Then, a suitable handle (not shown) is inserted into a handle hole 18 of the tightening cylinder 16 thereby to rotate the cylinder and to screw the tightening cylinder 16 into the outer ring 22. Accordingly the left and right inner rings 9, 10 are fixed against the outer ring 22 by the tightening cylinder 16, three bolts 36 and tapered surfaces 21, 27, whereby the rolls 29 are maintained in their inclined positions.

Figure 9:
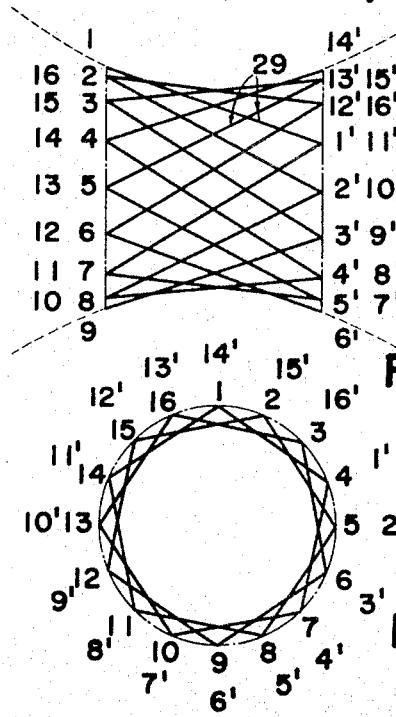
FIG. 9 is a diagrammatic side illustrating the operating principle of the present invention.
Figure 8:
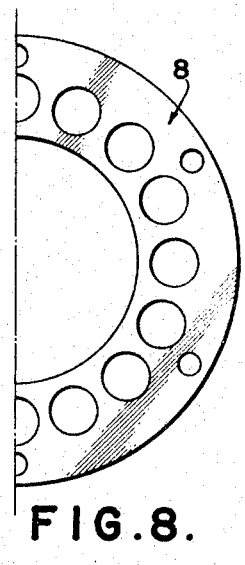
FIG. 8 is an end view of a cover for the roll supporting ring.
Figure 10:
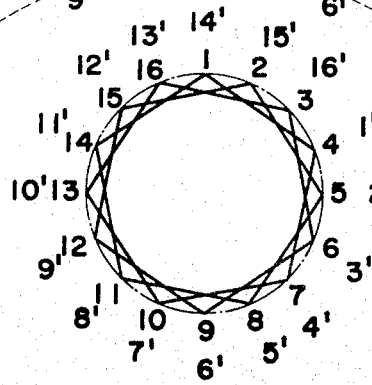
FIG. 10 is an end view thereof.

When the outer ring 22 is rotated by a motor (not shown) through gears 39, 28, the grinding rolls 29 rotate in the inclined state around the common axis of the supporting cylinders 1, 2. In FIGS. 9 and 10 the position of grinding rolls 29 are indicated by full lines 1–1', 2–2', 3–3' . . . 16–16', and the matrix lines of the rolls 29, when put together, constitute a hyperboloid of revolution as indicated by dotted lines in FIG. 9.

The cylindrical grinder according to the present invention accomplishes a grinding action along the matrix lines of the grinding rolls 29 which form a hyperboloid of revolution. The grinding portions of the grinding rolls 29 correspond to a circle inscribed by the matrix lines of the rolls in said inclined positions 1–1', 2–2', 3–3' . . . 16–16' in FIG. 10. Therefore, a cylindrical workpiece introduced into a circle defined by running grinding rolls 29 can be ground as desired.

As will be apparent from the foregoing description according to the present invention, it is possible to change the inclination of grinding rolls 29 to any desired angles to meet changes in the diameter of cylinders or workpieces. Furthermore, since a plurality of grinding rolls are used, any crack or chip in one of the rolls will not produce any serious trouble in operation.

What is claimed is:

1. A grinding device comprising a pair of supporting cylinders in coaxially spaced relation, means for axially displacing and angularly rotating the cylinders relative to one another, a plurality of grinding rolls arranged in an annular array around the common axis of the cylinders to cooperatively define a surface in the shape of a body of revolution which bounds an aperture in which a workpiece may be received and ground, and means supporting said rolls at the ends thereof, from respective cylinders for pivotable movement and circumferential displacement relative thereto such that relative axial and angular displacement of said cylinders will produce variation in the size of said aperture and in the shape of said body of revolution.

2. A device as claimed in claim 1 wherein said grinding rolls define a cylindrical array having a maximum aperture size when the cylinders are furthest apart, said rolls defining a hyperboloid of revolution of reduced aperture size with the cylinders closer together.

3. A device as claimed in claim 2 wherein said rolls have an elongated cylindrical shape.

4. A device as claimed in claim 3 wherein each roll comprises a spindle and a grinding sleeve mounted on said spindle.

5. A cylindrical grinding device comprising a pair of hollow roll supporting cylinders in spaced coaxial arrangement, a roll supporting ring adjacent each roll supporting cylinder for being secured thereto, a plurality of grinding rolls arranged in annular array around the axis of the cylinders, each roll having opposite ends respectively supported for pivotal movement by the roll supporting rings, said rolls cooperatively defining an aperture in which a workpiece to be ground can be introduced, an inner ring adjacent each roll supporting ring for being secured therewith, a key on the outer circumference of one inner ring, a tapered surface on the outer circumference of the other inner ring, an outer ring on the outer circumference of the inner ring, said outer ring having a key way and a second tapered surface on the inner circumference thereof respectively engaged with said key and the first tapered surface whereby turning of the outer ring produces inclination of the rolls and variation of the aperture formed therein, a hollow cylinder slidably fitted on said one inner ring, threads in the inner circumference of the outer ring and in the outer circumference of the hollow cylinder, said outer ring and hollow cylinder being engaged with each other at said threads, means supporting the roll supporting cylinders for rotation, and means engageable with the outer ring for rotating the same and thereby the inner rings, roll supporting rings and rolls, and the roll cylinders.

References Cited

UNITED STATES PATENTS

| | | | |
|---|---|---|---|
| 172,624 | 1/1876 | Hall | 82—1 |
| 2,588,903 | 3/1952 | Akins | 144—30 X |
| 2,865,150 | 12/1958 | Fuglie | 51—73 X |
| 2,994,163 | 8/1961 | Schulze | 51—73 |

OTHELL M. SIMPSON, *Primary Examiner.*

U.S. Cl. X.R.

51—241, 73